W. H. BOUTELLE.
OPHTHALMIC MOUNTING.
APPLICATION FILED OCT. 26, 1917.
1,296,159.
Patented Mar. 4, 1919.
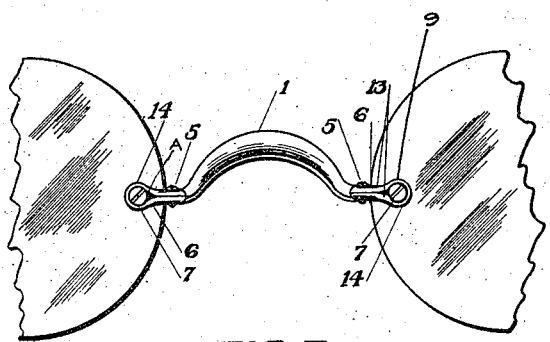
FIG. I.
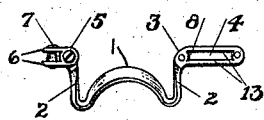
FIG. II.
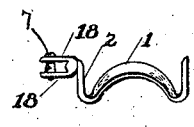
FIG. III.
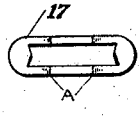
FIG. IV.
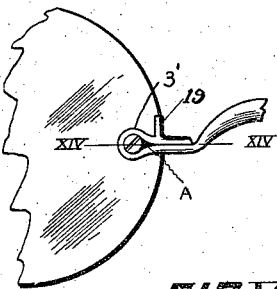
FIG. V.
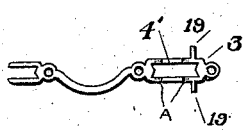
FIG. VI.
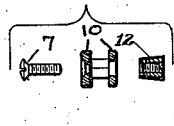
FIG. VII.
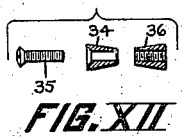
FIG. XII.
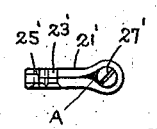
FIG. XV.
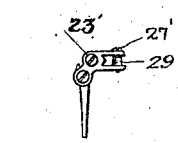
FIG. VIII.
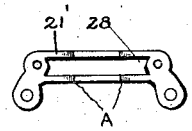
FIG. IX.
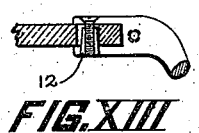
FIG. XIII.
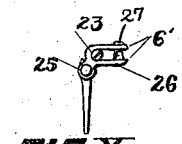
FIG. X.
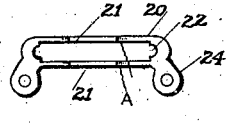
FIG. XI.
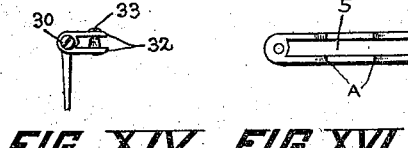
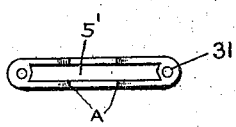
FIG. XIV  FIG. XVI.
INVENTOR
W. H. BOUTELLE
BY
ATTORNEYS

UNITED STATES PATENT OFFICE.

WILLIAM H. BOUTELLE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,296,159.  Specification of Letters Patent.  Patented Mar. 4, 1919.

Application filed October 26, 1917. Serial No. 198,611.

*To all whom it may concern:*

Be it known that I, WILLIAM H. BOUTELLE, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings and more particularly to what is known as a combined end piece and strap and the main object of the present invention is the provision of a combined end piece and strap which is formed of a single piece of material.

Another object of this invention is the provision of a one piece combination end piece and strap which is readily adapted for use upon either plain or toric lenses and can be quickly and readily applied or removed.

A further object of the present invention is the provision of a mounting of the above character wherein the glass is self-locking and when screwed up tight binds both side and edgewise on the lens.

A still further object of the invention is the provision of a mounting of this character wherein the end-piece is what is known as an invisible end-piece and wherein the straps can be readily tightened to the lenses by the turning of a set screw carried by the end piece.

Another object of the invention is the provision of a mounting of the above character wherein the nose bridge end pieces and lens straps are stamped from a single piece of material.

With the above and other objects in view the invention consists in the novel features of construction and the combination and arrangement of parts to be hereinafter more fully described, pointed out in the claims and shown in the accompanying drawings, in which—

Figure I is an opthhalmic mounting constructed in accordance with my invention.

Fig. II is a front elevation of a nose piece constructed in accordance with my invention showing one end in blank form.

Fig. III is a front elevation of a spectacle nose piece illustrating the strap as soldered on.

Fig. IV is a plan view of the blank from which the strap illustrated in Fig. III is formed.

Fig. V illustrates in front elevation a slightly modified form of my invention.

Fig. VI is a plan view of the blank from which the form illustrated in Fig. V is formed.

Fig. VII is a detail view part in elevation and part in section illustrating one form of screw to be used in connection with my improved mounting.

Fig. VIII is a side elevation of a temple strap constructed in accordance with my invention.

Fig. IX is a plan view of the blank from which the strap shown in Fig. VIII is formed.

Fig. X is a side elevation of a temple strap illustrating a modified form.

Fig. XI is a plan of the blank from which the temple strap shown in Fig. X is formed.

Fig. XII is a detail view part in elevation and part in section illustrating one form of screw to be used in connection with my improved temple strap.

Fig. XIII is a longitudinal sectional view taken on the line XIV—XIV of Fig. V through the lens showing the relation of the screw and the lens and illustrating how the tightening of the screw will securely hold the lens in position.

Fig. XIV is a side elevation of a temple strap illustrating another form of the invention.

Fig. XV is a top plan of the strap illustrated in Fig. XIV and

Fig. XVI is a plan view of the blank from which the strap shown in Fig. XIV is formed.

In carrying out my invention the nose bridge and end straps are formed of a single piece of material stamped out in one operation and includes the nose piece 1 from which extend the upwardly projecting arms 2 having their ends extended outwardly at right angles to provide the strap arms 3 which have formed therein the elongated slots 4. The arms 3 are adapted to be bent upon themselves as shown in Fig. II and securely held in position by means of the set screws 5 which extend through the extremities of the arms 3 and into the inner ends of the arms at a point adjacent the outer ends of the arms 2. From this operation it will be apparent that the spaced straps 6 are formed which are disposed upon opposite sides of the lenses and secured thereto by means of the screw members 7 and it will also be noted that at the inner ends of the straps 6 there are formed the substantially triangular shaped lugs 8 which are disposed between the straps 6 and adapted to engage the edges of the lenses to hold them against lateral movement between the straps.

In bending the arms 3 upon themselves their intermediate portions are curved as shown at 9 to form screw openings for the screws 7 which fasten the strap to the lens. Mounted upon the screws 7 are the washers 10 which are disposed upon opposite sides of the lens and threaded upon the screws are the tapering nuts 12 which when tightened down will tend to force the lens and nose piece into close engagement with each other. The action of the nut 12 when screwed onto the screw 7 is clearly illustrated in Fig. XIII, but while this particular screw is not shown in this view it is one upon which the tapering nut is used.

When the straps 6 are formed the side of the end piece portions, formed by the slots 4 are disposed in parallel relation as shown at 13 while the intermediate portions thereof are looped as shown at 9 to receive the screws 7 and from this it will be apparent that by the tightening of the screws 7 the parallel portions are forced apart which action in addition to the binding action of the tapering nut will draw the loops 9 inwardly and at the same time bring the lenses into closer engagement with the triangular studs 8 formed at the inner ends of the straps 6. From this it will be readily apparent that the lenses can be readily tightened to prevent any movement between the straps and securely held in place by having the lenses brought into close engagement with the stud portions 8 which tend to bite into the edge of the lens.

In Fig. III I have illustrated a form of strap which is made of a single separate piece of material and secured to the nose bridge by soldering or other suitable means after being bent into shape. In the making of this form of strap, the slotted blank 17 is bent upon itself to form the spaced ears 18 which are disposed upon opposite sides of the lens and securely fastened to the lens by the screw 7'. The intermediate portion of the blank 17 is secured to the arm 2 of the nose bridge at substantially midway of its ends or at the inner ends of the ears 18.

In Fig. VI I have illustrated a blank upon which are formed the fingers 19, said fingers being disposed upon opposite sides of the slots 4' and when the ends of the portions 3' are bent into position these fingers 19 are bent inwardly and arranged upon opposite sides of the lens and are adapted to form an engaging post for one end of the finger-piece spring and also a stop for the finger piece. This form of the invention is constructed in the same manner as the main form with the exception of the fingers 19 which project from the sides of the portions 3'.

In Figs. X and XI I have illustrated a blank form from which the temple end-piece is made, said blank including the slotted plate 20 which forms the side portions 21. At the ends of the slots are formed the semi-circular apertures 22 which, when the blank is bent upon itself to form the spaced straps 6', are disposed in alinement to form a transverse slot for the reception of a screw member 23 which tends to hold the ends of the blank together and at the same time form a bearing for the end of the lens, as it will be understood that the screw member is provided with a tapering nut to form a suitable bearing for the edge of the lens. The ears 24 which are formed upon the ends of the blank and disposed at an angle with respect to the body form suitable bearings for the temple dowel 25 when the blank is bent into its proper shape so that the temple end may be disposed between these ears 24 and swung upon the dowel pin 25. The side portions 21 formed by the slot in the blank are bent at their central portions to provide suitable curved portions 26 to receive the fastening screw 27 that holds the lens in place.

In Figs. VIII and IX I have illustrated a modified form of temple end fastener, wherein the semi-circular apertures are eliminated and the ends of the blanks are solid, as illustrated and provided with alined openings to receive the screws 23' which securely fasten the ends of the blanks together when folded. In this form of the invention just described the ends of the blank are provided at the inner ends of the slot with the triangular shaped studs 28 which engage the edge of the lens to securely hold the same against any relatively lateral movement, and as the screws 27' are tightened the lens will be brought into close contact with the studs 28 by the spreading of the side portions 21' and the bearing of the tapering nut 29 against the side walls of the opening in the lens. This action is the same as has been previously described in the foregoing specification in connection with other forms of the invention.

In Figs. XIV and XVI I have shown still another form of temple end piece wherein the same is formed of a straight blank having its ends provided with suitable screw openings adapted to be disposed in alinement when the blank is folded to receive the pivot screw 30 which pivotally connects the end piece with the temple. In the construction of this end piece the blank is first stamped with the longitudinal slot 5' and the screw openings 31 and then folded to provide the strap arms 32 adapted to be arranged upon opposite sides of the lens and secured thereto by means of the screw 33.

In Fig. XII I have illustrated a modified form of screw member which is provided with a tapering washer 34 arranged upon the screw 35 and in apposed relation with the tapering nut 36 so that a double tightening movement is obtained through the action of the washer member 34 and nut 36.

In Fig. XIII I have shown a cross section through a lens showing the relative position of the tapering nut 12 with respect to the wall of the opening in the lens and showing how the tightening of the nut will tend to draw the lens in toward the mounting and into engagement with the stud 8.

From the above description taken in connection with the accompanying drawings it will be apparent that I have provided a simple device wherein the nose bridge and strap members are formed of a single piece of metal and are provided with means whereby the lens can be readily tightened between the straps and securely held against any relative lateral movement. This also consists in forming the temple end piece out of a single piece including the straps and means for pivotally connecting the temple with the straps. It will be noted that the temple end piece can be constructed in various ways without departing from the scope of the invention.

In the main form of the invention as well as in the various modifications illustrated in the accompanying drawings I have shown the projections —A— formed on the side portions of the slotted blank which are adapted to fill the space in the loop adjacent the screw member when applied to the lens thus closing all cavities which would be liable to catch any dust or dirt should they remain unfilled.

I claim:

1. A one-piece member including a nose bridge, an arm extending from each end thereof, having a slot therein forming parallel side portions adapted to form loops when the arms are bent upon themselves.

2. A one-piece member including a nose bridge, an arm extending from each end thereof, having a slot therein forming parallel side portions adapted to form spaced loops when the arms are bent upon themselves and fingers extending from each side of the arms as and for the purpose set forth.

3. A device of the class described including an elongated slotted member adapted to form spaced loops when bent upon itself and pointed lugs disposed at each end of the slot as and for the purpose set forth.

4. A device of the class described including an elongated slotted member adapted to form spaced loops when bent upon itself and perforated ears extending from each end of the member at an angle with respect thereto.

5. A device of the class described including an elongated slotted member adapted to form spaced loops when bent upon itself, lens bearing members at the inner ends of the slot, and perforated ears extending at at angle from each end of the body.

6. A device of the class described including an elongated slotted member adapted to form spaced loops when bent upon itself, a screw member connecting said loops, and tapering members carried by said screw member as and for the purpose set forth.

7. A device of the class described, including an elongated member having a central slot to receive the lens, said member being bent upon itself whereby the folds will engage and retain a lens screw.

8. A device of the class described, including an elongated member having a central slot to receive the lens, said member being bent upon itself whereby the side portions thereof will form loops to engage and retain a lens screw.

9. A device of the class described, including an elongated member having a slot to receive the lens. said member being bent upon itself whereby the folds will engage and retain a lens screw, and perforated ears at each end of the body.

10. A device of the class described, including an elongated member having a central slot to receive the lens, said member being bent upon itself, whereby the folds will engage and retain a lens screw, and arms formed upon each side of the slot and adapted to be bent inwardly against the lens, as and for the purpose set forth.

In testimony whereof I have affixed my signature, in presence of two witnesses.

WILLIAM H. BOUTELLE.

Witnesses:
 E. M. HALVORSEN,
 H. E. COLEMAN.

Copies of this patent may be obtained for five cents each, by addressing the "Commissioner of Patents, Washington, D. C."